United States Patent
Oda

(10) Patent No.: US 9,307,101 B2
(45) Date of Patent: Apr. 5, 2016

(54) INFORMATION PROCESSING APPARATUS, IMAGE FORMING APPARATUS, INFORMATION PROCESSING METHOD, AND PROGRAM

(75) Inventor: Akihiko Oda, Hino (JP)

(73) Assignee: KONICA MINOLTA BUSINESS TECHNOLOGIES, INC. (JP)

( * ) Notice: Subject to any disclaimer, the term of this patent is extended or adjusted under 35 U.S.C. 154(b) by 180 days.

(21) Appl. No.: 13/355,419

(22) Filed: Jan. 20, 2012

(65) Prior Publication Data

US 2012/0194859 A1    Aug. 2, 2012

(30) Foreign Application Priority Data

Jan. 27, 2011    (JP) .............................. JP2011-015435

(51) Int. Cl.
*G06F 3/12*    (2006.01)
*H04N 1/00*    (2006.01)

(52) U.S. Cl.
CPC ....... *H04N 1/00323* (2013.01); *H04N 1/00344* (2013.01); *H04N 1/00347* (2013.01); *H04N 2201/3252* (2013.01); *H04N 2201/3253* (2013.01)

(58) Field of Classification Search
CPC ...................................................... B41J 29/38
See application file for complete search history.

(56) References Cited

U.S. PATENT DOCUMENTS

| 7,516,421 | B2 * | 4/2009 | Asano et al. ................... 715/850 |
| 7,668,792 | B2 * | 2/2010 | Hagino ............................ 706/45 |
| 2012/0026530 | A1 * | 2/2012 | Tsongas et al. ............... 358/1.14 |

FOREIGN PATENT DOCUMENTS

| JP | 2004-048674 | 2/2004 |
| JP | 2006-231675 | 9/2006 |

OTHER PUBLICATIONS

Notice of Reasons for Refusal issued by JPO for appl. No. 2011-015435, drafted Jun. 17, 2014, 2 pgs.
Translation of the Notice of Reasons for Refusal issued by JPO for appl. No. 2011-015435, drafted Jun. 17, 2014, 3 pgs.

* cited by examiner

*Primary Examiner* — Marivelisse Santiago Cordero
*Assistant Examiner* — Neil R McLean
(74) *Attorney, Agent, or Firm* — Squire Patton Boggs (US) LLP

(57) ABSTRACT

An information processing apparatus including: a communication section for communicating with a portable type terminal device which is provided with a photographing function, a display function, and a communication function; and a control section for: a) receiving a photographed image of an image forming apparatus, having been photographed by the portable type terminal device, from the portable type terminal device; b) determining a photographed location of the image forming apparatus based on the photographed image; and c) transmitting a display information according to the photographed location to the portable type terminal device.

21 Claims, 11 Drawing Sheets

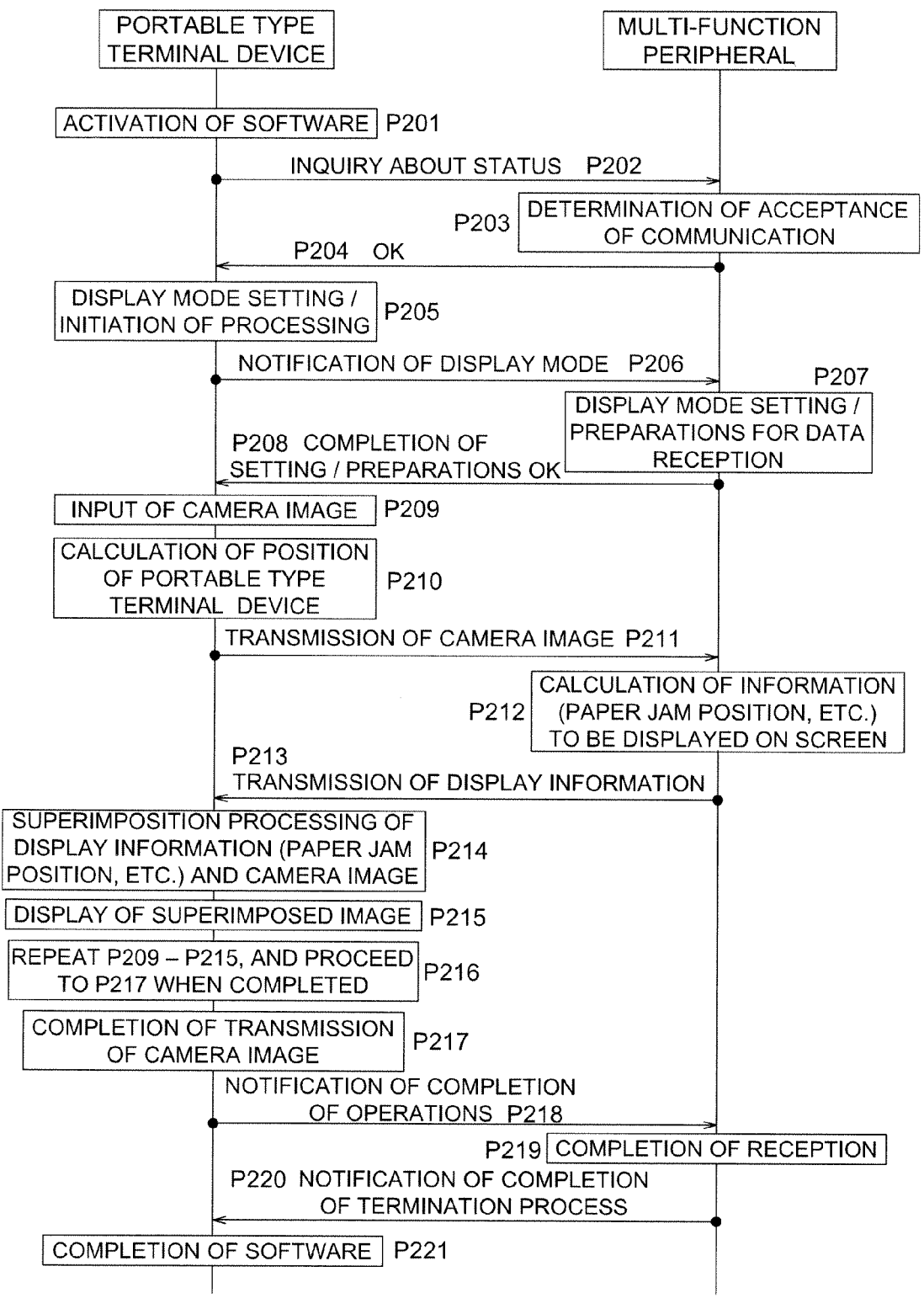

INFORMATION PROCESSING APPARATUS, IMAGE FORMING APPARATUS, INFORMATION PROCESSING METHOD, AND PROGRAM

This application is based on Japanese Patent Application No. 2011-015435 filed on Jan. 27, 2011 with the Japan Patent Office, the entire content of which is hereby incorporated by reference.

TECHNICAL FIELD

The present invention relates to an information processing apparatus, an image forming apparatus, an information processing method, and a program for transmitting information related to the image forming apparatus to a portable type terminal device, and displaying the information.

BACKGROUND OF THE INVENTION

In recent years, in the field of printers and copying machines used for commercial printing, a considerable speeding up which accompanies the increase in size is progressing. For example, high speed machines with printing speed more than or equal to 100 paper sheets per minute, and large size machines of which the length from one end to the other end stretches over 10 meters, have recently come into widespread use in the printing industry.

In cases such as these, as image forming apparatuses have a large increase in speed and size, the number of recording paper sheets, which are conveyed within an apparatus at a time, increases considerably, and therefore, when a jam (paper jam) occurs, the jam recovery job becomes more difficult and time consuming.

For example, in a case in which a paper jam occurs downstream in the paper sheet conveyance path, such as near paper sheet ejecting port, or the like, in an apparatus in which the number of recording paper sheets, being conveyed at a time in a printing process, comes to nearly 20 sheets, there are the cases in which the number of jammed paper sheets (including recording paper sheets being in mid-course in the conveying operation), existing within the apparatus, comes to nearly 10 sheets. An operator engaged in printing operations needs to remove a large number of jammed paper sheets one by one by confirming the jammed positions which are shown on an operation panel, thus, a removing operation for the jammed paper sheets becomes rather complex. Particularly in a case of a large size apparatus of which the length comes to nearly 10 meters, and if the operator needs to remove jammed paper sheets, being scattered within the apparatus, in order by watching an operation panel, there are cases in which a jammed paper sheet exist in a place which is not externally visible, or the operation panel is distantly-placed from the operator, and therefore, it becomes extremely cumbersome and troublesome work for the operator.

As a technique for reducing the burden of an operation for removing jammed paper sheets, or the like, a technique has been disclosed in Unexamined Japanese Patent Application Publication No. 2006-231675 (hereinafter, referred to as Patent Document 1), in which an operation section of a printing process apparatus is structured separately from a main-body of the apparatus, and information (such as information for recovering from paper jam, or the like), with respect to a position of the operation section, is displayed in the operation section by determining the position of the operation section by receiving a transmitting signal from a transmitter located in the operation section via a plurality of receivers installed in necessary locations in the main-body of the apparatus.

In the case of the structure, as described in the above-mentioned Patent Document 1, in which the position of an operation section (a portable type terminal device), which is separated from the main-body of an apparatus, is detected via a position detection means composed of a transmitter and receiver, or the like, it is necessary to install a large number of position detection means (for example, a plurality of receivers in the case of Patent Document 1) for detecting the position (3-dimensional position) of the operation section in the main-body of the apparatus, and as a result, there has arisen such a problem that the cost is considerably increased.

SUMMARY OF THE INVENTION

The present invention has been achieved in consideration of the above problems, and it is one of the main objects to provide an information processing apparatus, an image forming apparatus, an information processing method, and a program for realizing a display of information in accordance with a position of a portable type terminal device via a simple constitution in a case in which information with respect to an image forming apparatus is transmitted to a portable type terminal device on which the information is displayed.

In order to achieve the above described object, embodiments reflecting at least one aspect of the present invention are as follows.

[1] An information processing apparatus reflecting one aspect of the present invention includes, but is not limited to: a communication section for communicating with a portable type terminal device which is quipped with a photographing function, a display function, and a communication function; and a control section for: a) receiving a photographed image of an image forming apparatus, having been photographed by the portable type terminal device, from the portable type terminal device; b) determining a photographed location of the image forming apparatus based on the photographed image; and c) transmitting a display information according to the photographed location to portable type terminal device.

[2] The information processing apparatus of [1], reflecting another aspect of the present invention, wherein the control section is configured to: a) determine a view-point position of the portable type terminal device which generated the photographed image, based on the photographed image; and b) transmit a display information of a direction according to the view-point position to the portable type terminal device.

[3] The information processing apparatus of [1], reflecting still another aspect of the present invention, wherein the control section is configured to transmit a superimposed image, having been generated by superimposing the display information on the photographed image, to the portable type terminal device.

[4] The information processing apparatus of [1], reflecting still another aspect of the present invention, wherein the control section is configured to transmit a display information according to: a) an event arises in the image forming apparatus, the event which is to be notified to the portable type terminal device; and b) the photographed location, to the portable type terminal device.

[5] The information processing apparatus of [4], reflecting still another aspect of the present invention, may further include an input section for inputting a designated location information which indicates a designated location in which an event arises in the image forming apparatus, the event which is to be notified to the portable type terminal device, wherein the control section is configured to transmit: a), in a case in which the designated location, indicated by the designated location information having been input by the input section, is included in the photographed location, a first display information corresponding to that designated location to the portable terminal device; and b), in a case in which the designated location is not included in the photographed location, a second display information corresponding to that designated location to the portable terminal device.

[6] The information processing apparatus of [5], reflecting still another aspect of the present invention, wherein the second display information includes guidance information to the designated location.

[7] The information processing apparatus of [1], reflecting still another aspect of the present invention, wherein the display information includes at least either one of position information indicating a subscribed location of the image forming apparatus, a perspective image of the image forming apparatus, or operation information of the image forming apparatus.

[8] The information processing apparatus of [1], reflecting still another aspect of the present invention, wherein the display information includes information pertaining to at least either one of an error occurrence location, a maintenance location, or a location which necessitates an operation, of the image forming apparatus.

[9] The information processing apparatus of [2], reflecting another aspect of the present invention, wherein a predetermined mark for determining a view-point position of the portable type terminal device, which photographs the image forming apparatus, is provided on an outer surface of the image forming apparatus, wherein the control section is configured to determine the view-point position of the portable type terminal device based on a deformation of the predetermined mark included in the photographed image.

[10] The information processing apparatus of [1], reflecting still another aspect of the present invention, wherein the control section is configured to: a) receive, instead of the photographed image, photographed location information, which has been obtained by the portable type terminal device based on the photographed image, the photographed location information which indicates a photographed location of the image forming apparatus, and b) transmit a display information according to the photographed location of the image forming apparatus indicated by the photographing location information, to the portable type terminal device.

[11] The information processing apparatus of [10], reflecting another aspect of the present invention, wherein the control section is configured to: a) receive view-point position information which has been obtained by the portable type terminal device based on the photographed image, the view-point position information which indicates a view-point position of the portable type terminal device which generated the photographed image; and b) transmit a display information of direction according to the view-point position which is indicated by the view-point position information, to the portable type terminal device.

[12] An image forming apparatus reflecting one aspect of the present invention includes, but is not limited to: any one of the information processing apparatus described in [1] through [3]; and a detection section for detecting an occurrence of an event arising in the image forming apparatus, the event which is to be notified to the portable type terminal device, wherein the control section is configured to transmit display information according to the event detected via the detection section and the photographed location.

[13] A nontransitory computer-readable recording medium recorded therein a program to enable functions of an information processing apparatus, reflecting one aspect of the present invention includes, but is not limited to, the functions including, but is not limited to: communicating with a portable type terminal device which is equipped with a photographing function, a display function, and a communication function; and receiving a photographed image of an image forming apparatus, having been photographed by the portable type terminal device, from the portable type terminal device, determining a photographed location of the image forming apparatus based on the photographed image, and transmitting a display information according to the photographed location to the portable type terminal device.

[14] A nontransitory computer-readable recording medium recorded therein a program to enable functions of a portable type terminal device which is equipped with a photographing function, a display function, and a communication function, reflecting one aspect of the present invention includes, but is not limited to, the functions including, but is not limited to: obtaining a photographed location, based on a photographed image of an image forming apparatus having been photographed, and transmitting a photographed location information which indicates the photographed location, to an information processing apparatus; receiving a display information according to the photographed location of the image forming apparatus, indicated by the photographed location information, from the information processing apparatus; and displaying the received display information from the information processing apparatus.

[15] The nontransitory computer-readable recording medium of [14], reflecting another aspect of the present invention, the functions of the portable type terminal device further comprises: obtaining a view-point position of the portable type terminal device which generated the photographed image, based on the photographed image, and transmitting view-point position information which indicates the view-point position to an information processing apparatus; and receiving a display information of direction according to the view-point position of the portable type terminal device indicated by the view-point position information, from the information processing apparatus.

BRIEF DESCRIPTION OF THE DRAWINGS

The preferred embodiments of the present invention are shown by way of example, and not limitation, in the accompanying figures, in which:

FIG. 11 is a sequence diagram illustrating a processing flow of a multi-function peripheral and a portable type terminal device according to a second preferred embodiment of the present invention.

DETAILED DESCRIPTION OF THE PREFERRED EMBODIMENTS

Hereinafter, preferred embodiments of the present invention will be described in detail with reference to the accompanying drawings, without the present invention being limited to the embodiments.

[First Preferred Embodiment]

Figure 1:
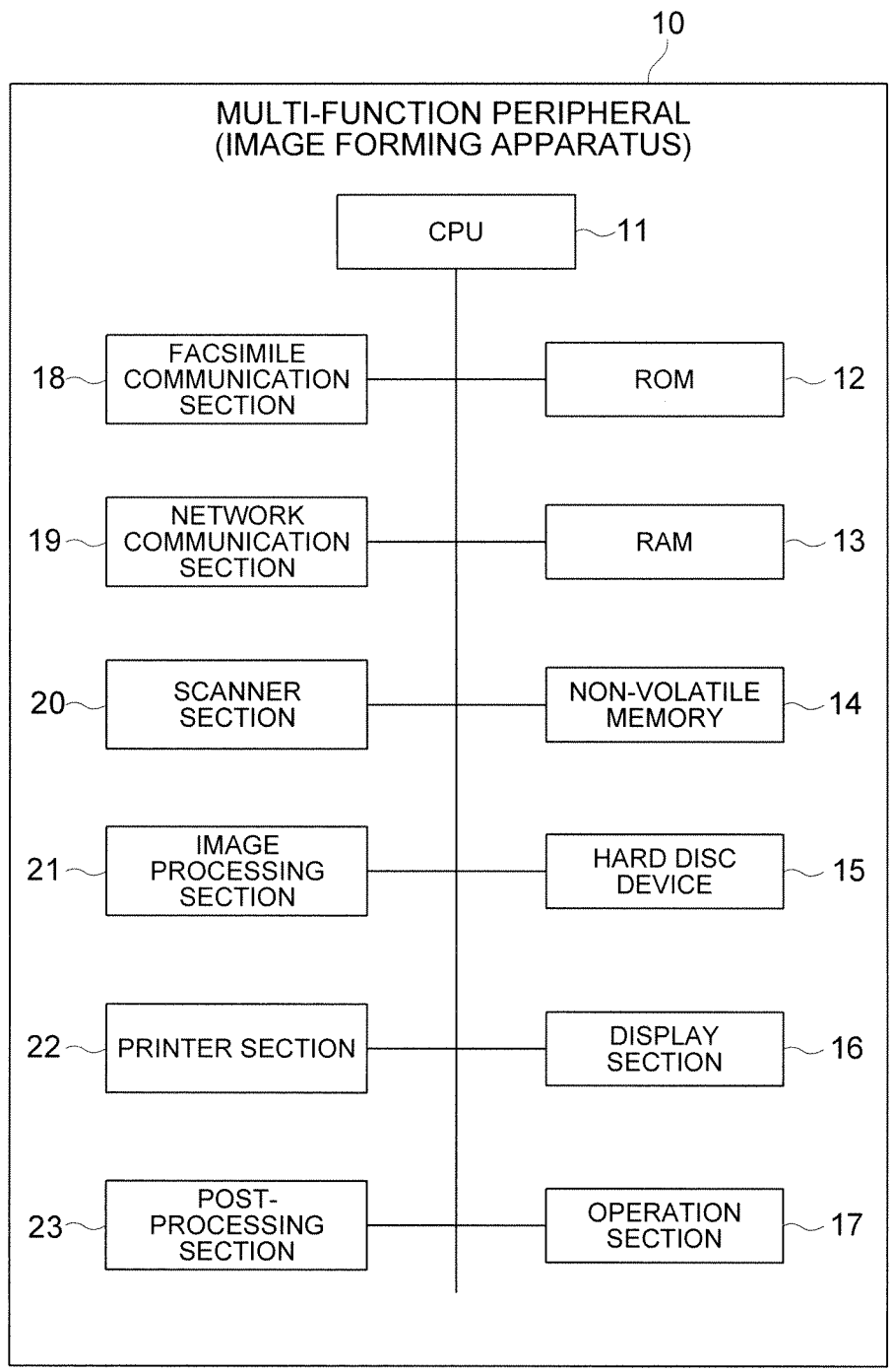
FIG. 1 is a block diagram schematically illustrating an example of a multi-function peripheral (image forming apparatus) according to a first preferred embodiment of the present invention.

FIG. 1 is a block diagram schematically illustrating an example of multi-function peripheral (MFP) 10 according to a first preferred embodiment of the present invention. MFP 10 is provided with functions such as: a) a copying function for optically reading out an original document and printing out the duplicated image on a recording medium; b) a scanning function for storing image data of a document that has been read out in the form of a file or transmitting image data of a document that has been read out to an external terminal, such as a personal computer, and a server; c) a printer function for forming and outputting, on a recording medium, an image based on print data, having been received from an external terminal, or an image based on image data, having been stored in MFP 10; and d) a facsimile function, and the like.

MFP 10 is configured by connecting ROM (read only memory) 12, RAM (random access memory) 13, non-volatile memory 14, hard disc device 15, display section 16, operation section 17, facsimile communication section 18, network communication section 19, scanner section 20, image processing section 21, printer section 22, and post-processing section 23, to CPU (central processing unit) 11, as a control section that comprehensively controls the operations of this MFP 10.

CPU 11 has an OS program as a base and executes middleware, application programs, and the like, based on the OS program. ROM 12 stores various kinds of programs therein, and as CPU 11 executes processing in accordance with those programs, each function of MFP 11, such as execution of a job, or the like, is realized. RAM 12 is utilized as a working memory to temporarily store various kinds of data when CPU 11 executes the programs, an image memory to store image data, and the like. It should be noted that other necessary programs are loaded from hard disc device 15 to RAM 13, and executed.

Non-volatile memory 14 is a rewritable memory (flash memory) whose stored contents are retained even when the power supply to the memory has been switched off. Non-volatile memory 14 memorizes particular information of the apparatus (apparatus ID (IDentification), IP (Internet Protocol), address, and the like), various setting information, and the like. Hard disc device 15 is a large capacity non-volatile memory device, and is utilized for storage of print data and image data, for example, in addition to programs, or the like.

The operation panel of MFP 10 consists of display section 16 and operation section 17. Display section 16 consists of a liquid crystal display, or the like, and displays various screens such a main screen, a menu screen, an operation screen, a setting screen, information display screen, and the like. Operation section 17 accepts various kinds of operations by the user. Operation section 17 consists of a touch panel, that is provided on top of the screen of display section 16 and that detects the coordinate positions which have been depressed, a numerical keypad, a character input key, a start key, and the like.

Facsimile communication section 18 controls operations relating to facsimile transmission and reception. Network communication section 19 controls operations relating to communication via a network such as LAN (Local Area Network), and the like.

Scanner section 20 optically reads a document image so as to acquire image data representing the document image. Scanner section 20 is constituted by, for example, but is not limited to: a) a light source to emit light to be irradiated onto the document; b) a line image sensor to receive the light reflected from the document so as to read every one of scanning lines of the document image in its width direction; c) a shifting mechanism to sequentially shift the reading position in the longitudinal direction of the document one by one in a unit of one scanning line; d) an optical system that includes lenses, mirrors, and the like, to guide the light reflected from the document to the line image sensor so as to form an image thereon; e) an analogue to digital converting section to convert analogue signals, outputted by the line image sensor, to digital image data; and the like.

Image processing section 21 carries out various image processings such as image correction, image rotation, image enlargement and reduction, compression and decompression of image data, and other processing.

Printer section 22 forms and outputs an image on a recording medium based on image data via an electro-photographic process. Printer section 22 is configured as a so-called laser printer provided with, for example, but is not limited to: a) a conveyance device for recording media; b) a photoconductive drum; c) a charging device; d) an LD (laser diode) controlled to be tuned on and off in accordance with the input image data; e) a scanning unit to scan the laser light radiated from the LD onto the photoconductive drum; f) a developing device; g) a transfer separating device; h) a cleaning device; and i) a fixing device. Another method of the printer such as a LED printer, in which LEDs (Light Emitting Diodes) radiate the photoconductive drum in place of the laser light, may be used.

Post-processing section 23 carries out post-processing (finishing processing), such as stapling, punching, folding, book-binding, or the like, onto recording media which have been printed and output by printer section 22.

Also, MFP 10 is provided with functions such as: a) a function for detecting occurrences of various kinds of predetermined events; b) a function for detecting the occurrence location of these events; and c) a function for displaying the events and the occurrence location of the events on display section 16 automatically, or via reception of a manual operation via operation section 17. Various kinds of events include an error due to a paper jam, a failure, or the like, the necessity of maintenance such as inspection, replacement of consumable parts, and the like, the necessity of manual operation of a panel or a lever in association with an error or maintenance, and the like. With respect to the detection of occurrence locations of these events, the locations subject to be detected, namely, detection locations of error occurrence, detection locations which necessitate maintenance (maintenance locations), and detection locations which necessitate a manual operation (manual operation locations) in association with an error or maintenance, are also predetermined. With respect to the occurrence of an error and the necessity of maintenance (maintenance timing), a sensor and program, and the like, are used for the detection.

Also, MFP 10 is provided with functions such as: a) a function for communicating, via a network, with a portable type terminal device equipped with a camera, the portable type terminal device into which a dedicated application program to communicate with the MFP has been installed; and b) a function for receiving a photographed image of the MFP which has been photographed via the portable type terminal device, and transmitting display information according to the photographed location of the MFP, which has been identified based on the photographed image, to the portable type terminal device so that the display information is displayed.

Display information is information with respect to a location where an occurrence of the above-mentioned events (an error, necessity of maintenance, and necessity of manual operation in association with error or maintenance) has been detected. Of the predetermined plural locations subject to be detected, the location, which has been actually detected as an event, which is subject to be detected, has occurred, becomes a designated location (prescribed location) of which the display information is to be transmitted to the portable type terminal device. Display information is information with respect to the designated location. Specifically, display information includes: a) information (position information) which indicates the position of the designated location; b) image information (skeleton image) which illustrates the designated location in a transparent state (framed state); c) information (guidance information) which guides toward the designated location; d) information (operation information) which indicates the content of operations for the designated location; and the like.

Image data of the display information is memorized in a database which has been stored in hard disc device 15 (or non-volatile memory 14). Position information, guidance information, and operation information are generated in advance by using characters, symbols, drawings, and marks, for example, and memorized. With respect to the skeleton image, three-dimensional CAD (Computer Aided Design) data of skeleton images (transparent image/framed image) of necessary locations (plural locations subject to be detected), which have been generated by three-dimensional CAD at the time of designing MFP 10, may be used, and the three-dimensional CAD data are memorized.

Also, various types of display information (position information, skeleton image, operation information), excluding guidance information, are memorized in the database in correspondence with the location subject to be detected. For example, by setting a three-dimensional coordinate system in the interior space of MFP 10, three-dimensional coordinate positions (X,Y,Z) of the location subject to be detected, in the three-dimensional coordinate system, may be memorized in the database in correspondence with various types of display information which correspond to the location to be detected. The three-dimensional coordinate position (center position) of the location subject to be detected may be a barycentric position of the location subject to be detected, or may be a reference (standard) position, or the like, which has been appropriately set.

Figure 2:
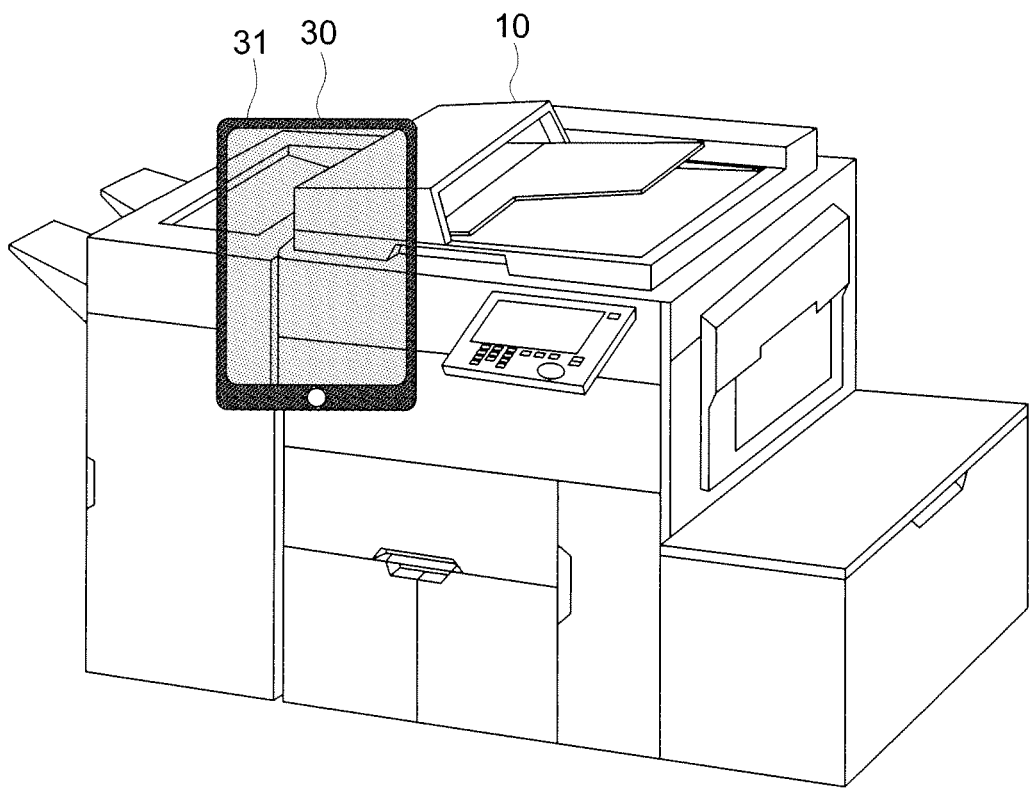
FIG. 2 is a diagram illustrating photographing of a multi-function peripheral by a portable type terminal device and a displayed example of the photographed image.

FIG. 2 is a diagram illustrating photographing of MFP 10 by portable type terminal device 30 and a displayed example of the photographed image. Specifically, the figure illustrates a state in which the user photographs MFP 10 via the camera function of portable type terminal device 30 by operating portable type terminal device 30, and a photographed image is being displayed in display section 31 of portable type terminal device 30.

Portable type terminal device 30, according to this preferred embodiment, consists of general-purpose equipments such as a Smartphone, or the like, which integrates a cellular phone and a PDA (Personal Digital Assistant). For this portable type terminal device 30, a general-purpose cellular phone or PDA, both of which are equipped with photographing function (camera function), display function, and communication function, may be used, or a dedicated terminal device, which is equipped with those functions, may be attached to MFP 10 and the dedicated terminal device may be used as a portable type terminal device. Also, in the case of a dedicated terminal device, either wireless communication or wire communication can be employed.

A dedicated application program that performs communication with MFP 10 is installed in general-purpose portable type terminal device 30. Portable type terminal device 30 communicates with MFP 10 by activating this application program, and transmits a photographed image of MFP 10, which has been photographed via a camera section therein, to MFP 10, and displays display information, having been received from MFP 10, in display section 31.

Next, photographing of MFP 10 via portable type terminal device 30 and display of information will be described. Here, a case is described as an example in which a paper jam occurs and display information with respect to the paper jam occurrence location is displayed in portable type terminal device 30. Also, (1) display examples of various types of display information, (2) examples of identifying method of the photographed location, (3) examples of determining methods of display information according to the photographed location, (4) examples of generating methods of display information according to a positional relationship between the portable type terminal device and the photographed location, will be described below in order.

(1) Display Examples of Various Types of Display Information:

As illustrated in FIG. 2, the user holds portable type terminal device 30 in his/her hand, and photographs an arbitrary location of MFP 10 from the circumferences of MFP 10 (from the front side of MFP 10 in the case of the example of FIG. 2) via the camera function (camera section) of portable type terminal device 30. Portable type terminal device 30 displays the photographed image of the arbitrary location of MFP 10, photographed from the view-point position of the camera section, in display section 31.

Figure 3:
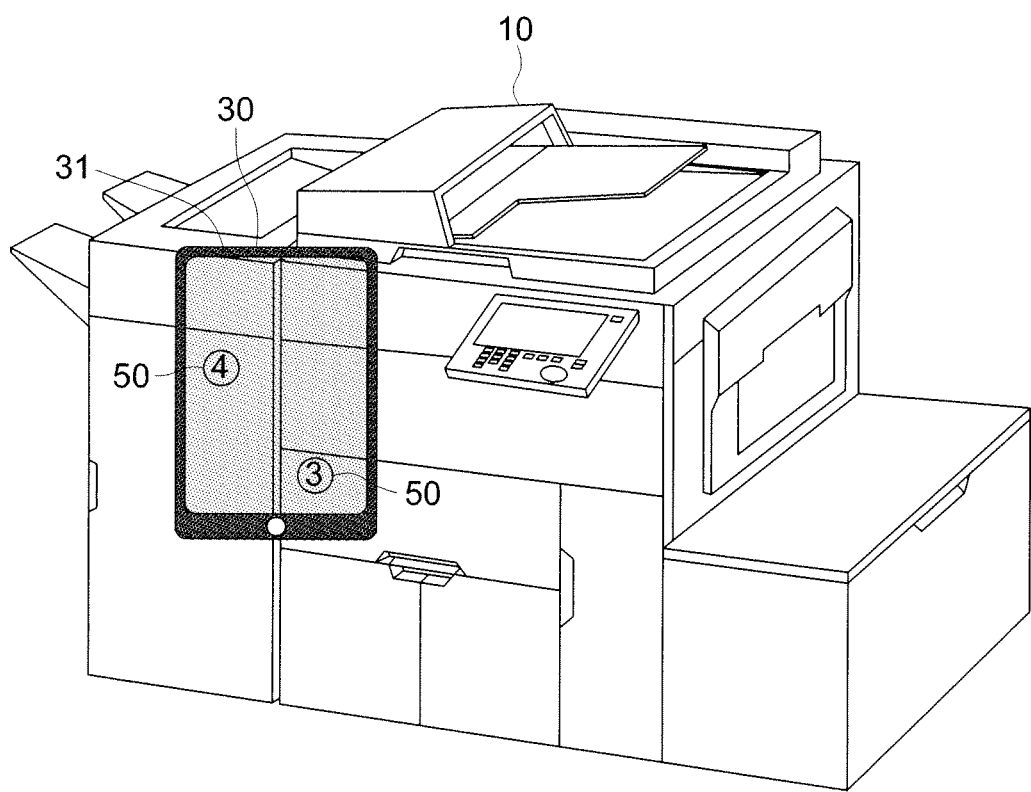
FIG. 3 is a diagram schematically illustrating a state in which a superimposed image is displayed, which has been generated by superimposing information, which indicates paper jam positions, on a photographed image of a multi-function peripheral by a portable type terminal device.

FIG. 3 is a diagram schematically illustrating a state in which the photographed image of the specific location of MFP 10 photographed by portable type terminal device 30 is displayed by superimposing thereon paper jam position images 50, which are information indicating paper jam occurrence positions. In this example, paper jam position image 50 is composed of a number (numeric character).

Figure 4:
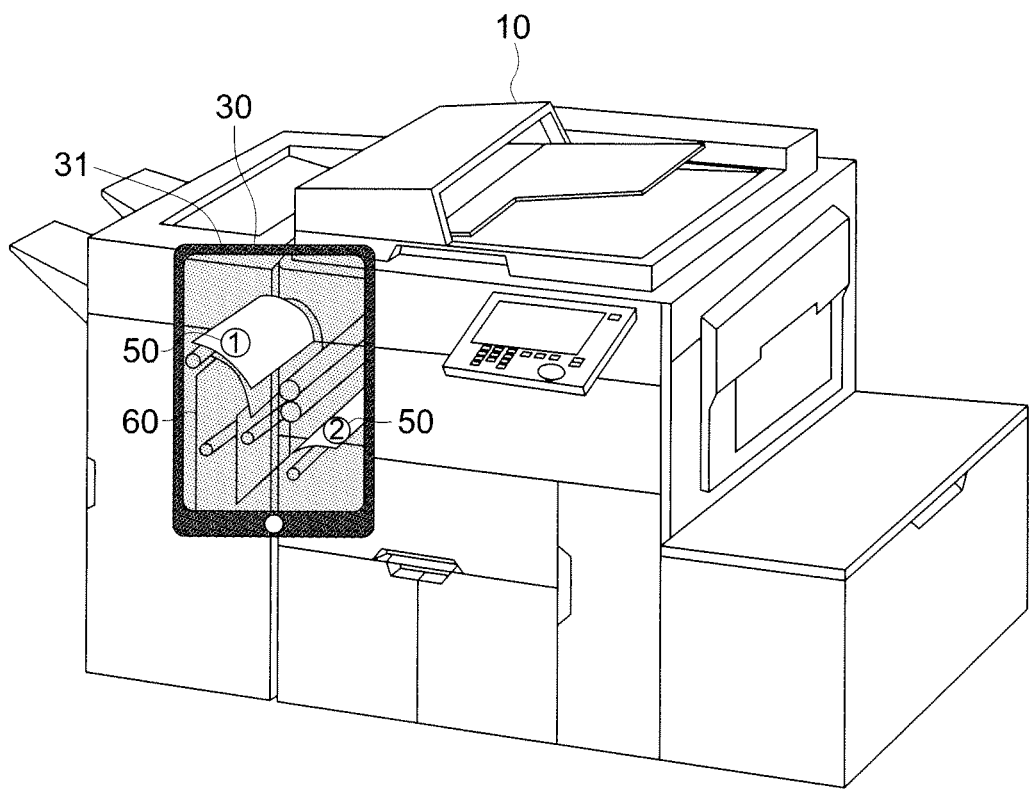
FIG. 4 is a diagram schematically illustrating a state in which a superimposed image is displayed, which has been generated by superimposing a skeleton image, which virtually indicates paper jam positions and situations, on a photographed image of a multi-function peripheral by a portable type terminal device.

FIG. 4 is a diagram schematically illustrating a state in which the photographed image of the specific location of MFP 10 photographed by portable type terminal device 30 is displayed by superimposing thereon skeleton image 60, which virtually indicates internal situations of paper jam occurrence positions and jammed paper sheets.

Figure 5:
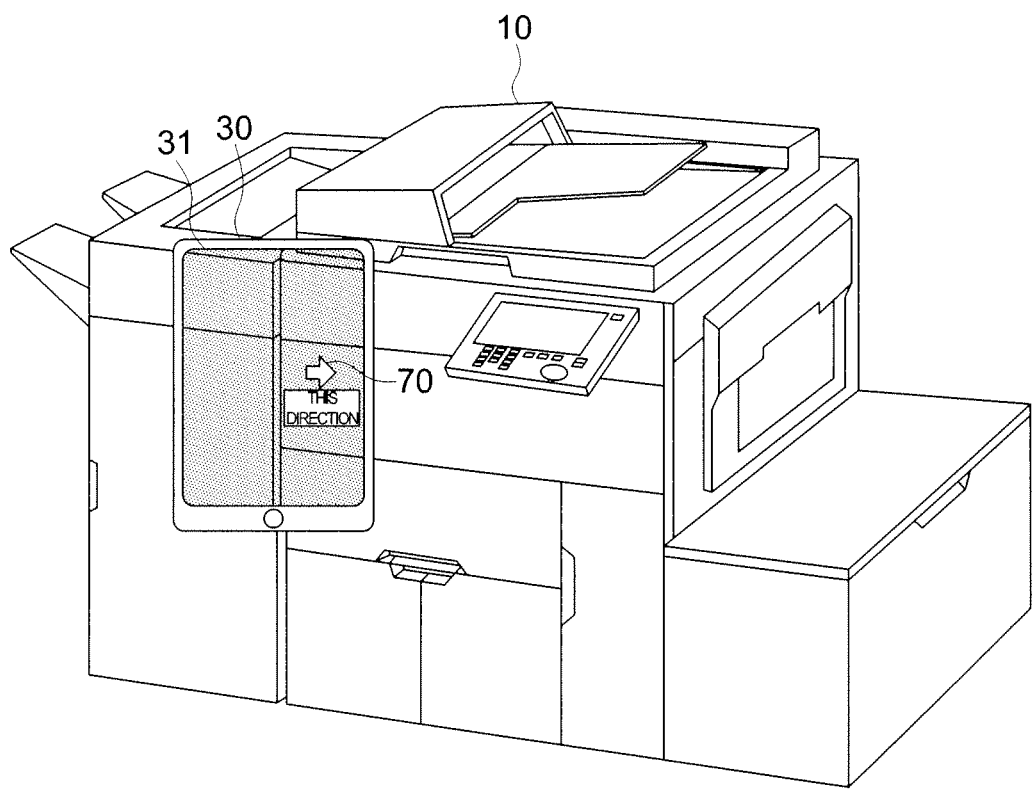
FIG. 5 is a diagram schematically illustrating a state in which a superimposed image is displayed, which has been generated by superimposing information, which indicates a direction of the paper jam position (direction in which a jammed paper sheet exists), on a photographed image, of a multi-function peripheral, by a portable type terminal device.

FIG. 5 is a diagram schematically illustrating a state in which the photographed image of a location other then paper jam occurrence position of MFP 10 photographed by portable type terminal device 30 is displayed by superimposing thereon paper jam direction image 70, which indicates the direction of paper jam position (direction in which a jammed paper sheet exists. In this example, paper jam direction image 70 is composed of an arrow mark, which indicates the direction of paper jam position, and characters ("THIS DIRECTION").

(2) Examples of Identifying Method of the Photographed Location:

Photographed location of MFP 10, by portable type terminal device, is identified based on a photographed image. For this identification (determination) of photographed location based on the photographed image, a known image verification/determination technology is utilized.

For example, a database of collation information is stored in hard disc device 15 (or non-volatile memory 14), and images (image data) of characterizing portions of MFP 10, which can be used as collation information, are memorized in the database in correspondence with the three-dimensional coordinate positions of the characterizing portions. Various types of shape portions of which the circumferential boundary can be recognized by its profile, color, or the like, or profile itself may be utilized for the characterizing portions, or a predetermined mark, or the like, which is provided on the outer surface of MFP 10, may be used.

In image collation, an image of the characterizing portion is extracted from the photographed image of MFP 10 by portable type terminal device 30, and the image of the characterizing portion is collated against images of characterizing portions for collation having been stored in the database, and an image of the characterizing portion for collation, that matches the extracted image of the characterizing portion, is identified. From three-dimensional coordinate positions associated with the image matched to the characterizing portion, having been stored in the database, and the position and size of the characterizing portion (characterizing portion having been extracted) in the photographed image, the photographed location of MFP 10, which is contained in the photographed image, is identified by the range of three-dimensional coordinate.

(3) Examples of Determining Method of Display Information According to the Photographed Location:

As described above, the locations (three-dimensional coordinate positions), subject to be detected, of the event (an error, necessity of maintenance, necessity of manual operation in association with error or maintenance), which is subject to be detected in MFP 10, are memorized in the database in correspondence with various types of display information (position information, skeleton image, operation information), excluding guidance information. The location, in which an event subject to the detected has occurred, becomes the designated location (subscribed location), and display information corresponding to this designated location is selected and transmitted to portable type terminal device 30.

Here, in a case in which the designated location (three-dimensional coordinate position) is included in the identified photographed location (the range of three-dimensional coordinate), position information (paper jam position image 50), skeleton image (skeleton image 60), and operation information, or the like, are determined as display information to be transmitted to portable type terminal device 30. In a case in which the designated location is not included in the identified photographed location, in accordance with the photographed location, guidance information (an arrow mark, or the like, to indicate the direction of designated location from the photographed location), which guides to the designated location, is determined as display information to be transmitted to portable type terminal device 30.

It should be noted that, in a case in which plural designated locations exist, only guidance information which corresponds to the nearest designated location may be determined as a target to transmit, or each guidance information which corresponds to each of the all designated locations may be determined as a target to transmit.

(4) Examples of Generating Method of Display Information According to a Positional Relationship between the Portable Type Terminal Device and the Photographed Location:

In a case in which display information is skeleton image, a skeleton image, of a direction according to the view-point position (direction as viewed from the view-point position) of the camera section of portable type terminal device 30, is generated. This view-point position is identified based on the photographed image of MFP 10 by portable type terminal device 30. Specifically, a characterizing portion, which is not included in the photographed image, is extracted and the view-point position is determined based on the characterizing portion. The above described various types of shape portions or profiles may be utilized for the characterizing portions, or a predetermined mark, or the like, which is provided on the outer surface of MFP 10, may be used.

Figure 6:
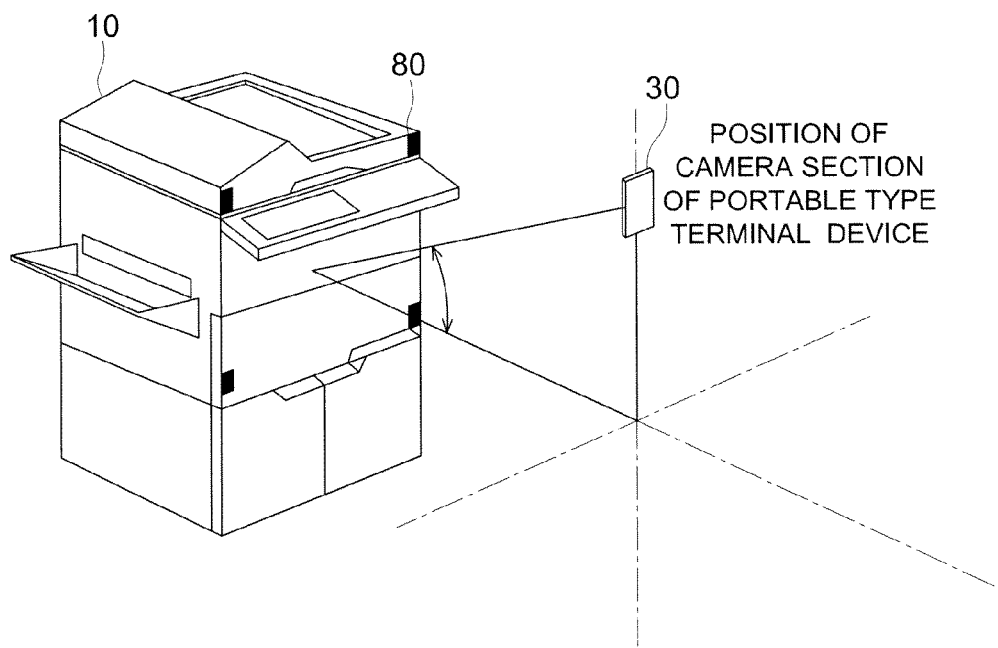
FIG. 6 is an explanatory diagram schematically illustrating an example of a method for identifying a view-point position of a portable terminal device, which photographs a multi-function peripheral, by using four marks provided on the multi-function peripheral.
Figure 7:
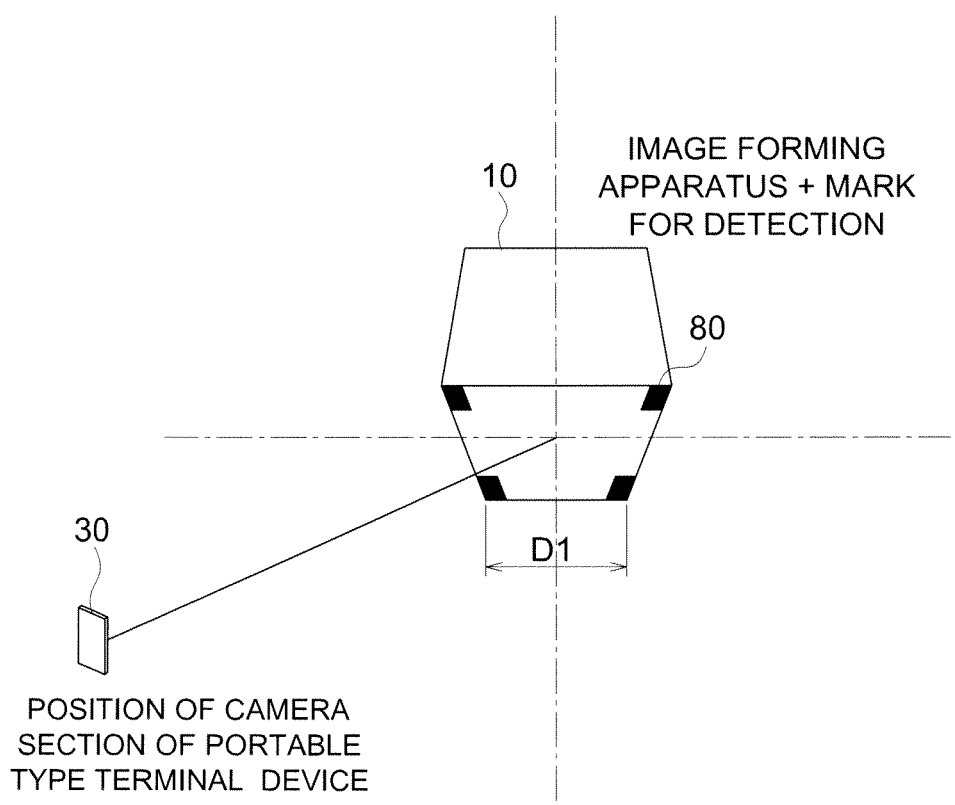
FIG. 7 is a diagram schematically illustrating a way in which the four marks in FIG. 6 are viewed when the multi-function peripheral is viewed from an upper oblique angle on the front side.

Identifying methods of the view-point position using a mark are exemplified in FIGS. 6 through 9. As illustrated in FIGS. 6 and 7, a plurality of black marks 80 is provided on the outer surface (front surface in the cases of the examples in the figures) of MFP 10. Information such as the size (including shape) of these marks 80, placement interval (D1), and the like, are registered in advance in non-volatile memory 14, or the like.

Figure 8:
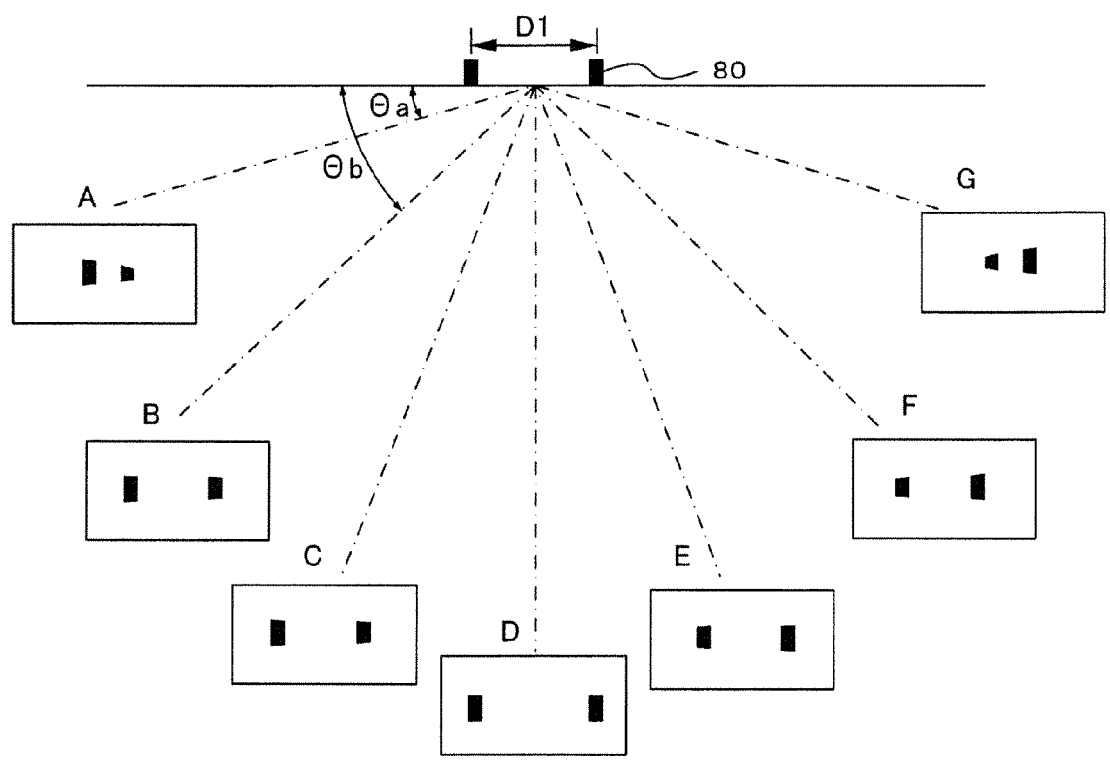
FIG. 8 is a diagram schematically illustrating states of the two marks contained in each photographed image when the two marks illustrated in FIG. 6 were photographed by changing the distance and angle between a portable type terminal device and a multi-function peripheral.
Figure 9:
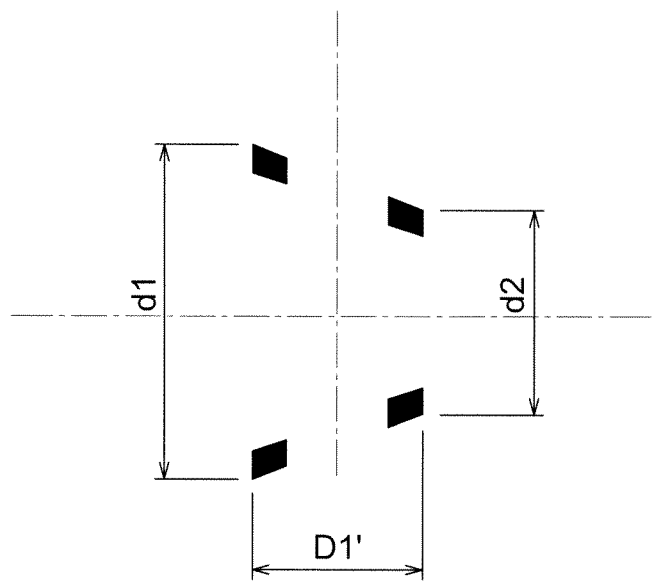
FIG. 9 is an explanatory diagram schematically illustrating an example of a method for obtaining a direction of a portable type terminal device based on a placement interval in the longitudinal direction and the distances in the lateral direction between four marks contained on a photographed image.

When a location, including marks 80, is photographed by portable type terminal device 30 from the front surface side of MFP 10, marks 80 are shown up in the photographed image. For example, the images of marks 80, as illustrated in FIGS. 8 and 9, are shown up. These images of marks 80 are extracted as the characterizing portions, and the view-point position of the camera section is obtained by calculating the distance to portable type terminal device 30 and the angles (angles in each of upward, downward, leftward, and rightward directions) based on the size of the extracted images of marks 80, the shape (distortion angle), the placement interval, and information which have been registered in advance, of the extracted images of marks 80. In other words, the view-point position of the camera section is obtained by calculating the distance to portable type terminal device 30 and the angles (angles in each of upward, downward, leftward, and rightward directions) based on how the size of the extracted images of marks 80, the shape (distortion angle), the placement interval, and the like, are deformed with respect to the actual marks 80 provided on MFP 10.

For example, in a case in which the images of four marks 80, illustrated in FIG. 9 as an example, are shown, the angle, between the actual four marks 80 provided on MFP 10 and the camera section of portable type terminal device 30, can be obtained from the ratio of placement interval (D1) in longitudinal direction according to the registered information and placement interval (D1') in the photographed image, and the ratio of distance d1 of the two marks on the left side in lateral direction and distance d2 of the two marks on the right side in lateral direction.

As described in the above examples, the view-point position of the camera section of portable type terminal device 30 is identified, and a skeleton image, as viewed from the view-point position, is generated from three-dimensional CAD data having been memorized in the database.

Next, operations of MFP 10 and portable type terminal device 30 will be described.

Figure 10:
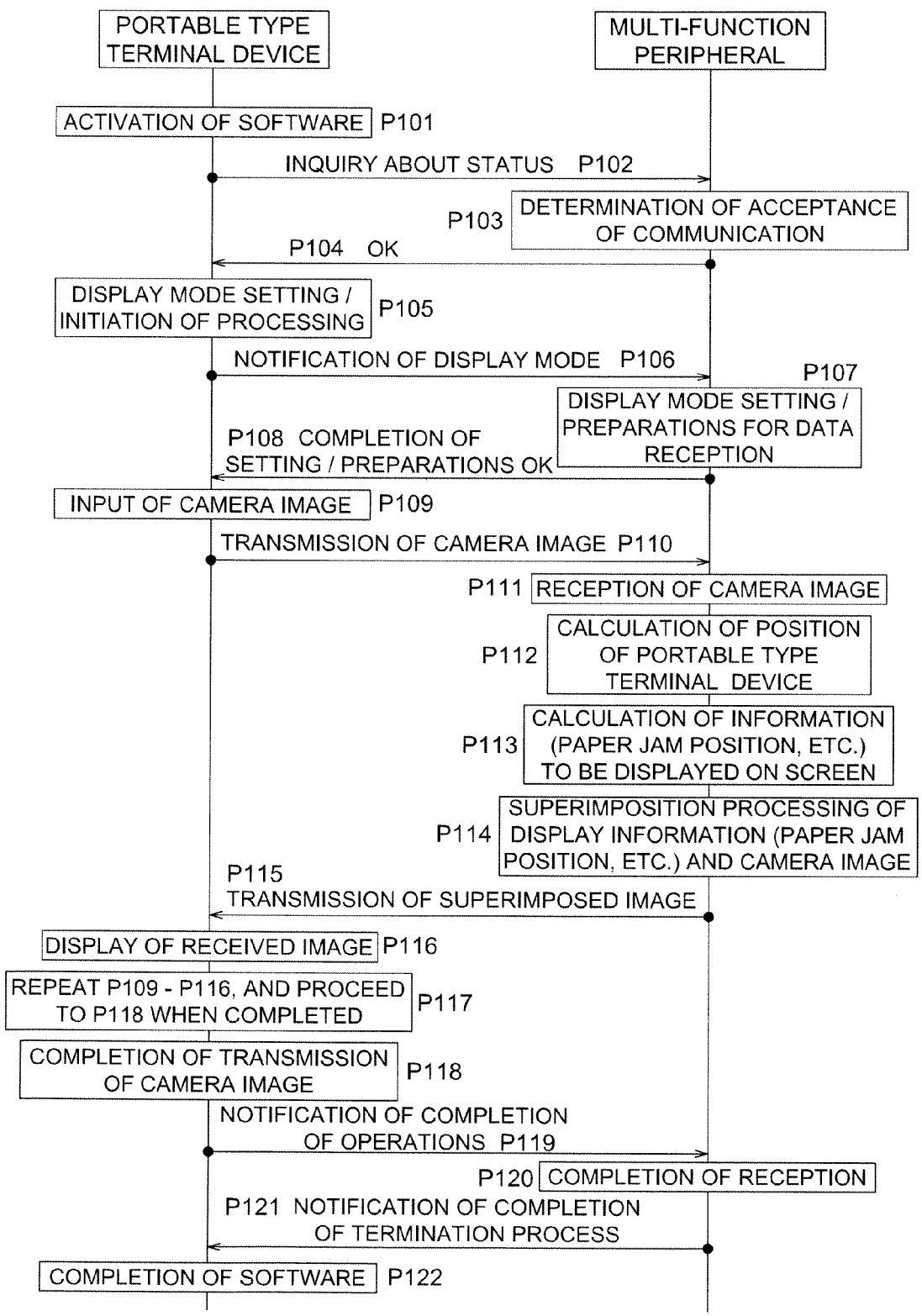
FIG. 10 is a sequence diagram illustrating a processing flow of a multi-function peripheral and a portable type terminal device according to the first preferred embodiment of the present invention.

FIG. 10 is a sequence diagram illustrating a processing flow of MFP 10 and portable type terminal device 30.

Portable type terminal device 30 activates the dedicated application program that performs communication with MFP 10, in response to an operation from the user (P101). When the application program has been activated, MFP 10, with which it is to communicate, is identified by designating the IP address of MFP 10.

Portable type terminal device 30 (being as dedicated application program) makes inquiries of MFP 10, which is to communicate with, to check if MFP 10 can accept communication at present or not (P102). At this point of time, portable type terminal device 30 also transmits authentication information, or the like, which has been registered to portable type terminal device 30 at the same time, and the information may be memorized at MFP 10 side as a user authentication data.

MFP 10 determines, upon receiving an inquiry from portable type terminal device 30, whether or not the MFP is in the state in which the MFP can communicate with portable type terminal device 30 (P103). For example, MFP 10 determines that the MFP cannot accept communication in a case in which a fatal error is occurring within the MFP. Here, in the following description, it will be assumed that such an error has not occurred and the MFP can accept communication.

MFP 10 notifies portable type terminal device 30 of the determination result of "Able to communicate (OK)" (P104). Upon receiving the notice of "Able to communicate (OK)" from MFP 10, portable type terminal device 30 receives from the user the selection of display mode (display of paper jam position, display of skeleton, display of maintenance parts, or the like), in the course of displaying information with respect to MFP 10, to determine the display mode, and instructs initiation of communication (P105). Then, portable type terminal device 30 notifies MFP 10 of the display mode, having been determined, and the initiation of communication (P106).

MFP 10 sets up the display mode, which was notified from portable type terminal device 30, and makes preparations for receiving image data from portable type terminal device 30 (P107). When the set-up of display mode and the preparations for receiving image data have been completed, MFP 10 notifies portable type terminal device 30 of the completion of the set-up of display mode and the preparations for receiving image data (P108).

After the notification, portable type terminal device 30 photographs MFP 10 via the camera section by receiving camera shooting operations by the user, and inputs the camera image (photographed image) (P109). The camera image of MFP 10, having been input, is transmitted to MFP 10 (P110).

MFP 10 stores the camera image, having been received from portable type terminal device 30, in RAM 13 (or non-volatile memory 14) (P111). MFP 10 analyzes the received camera image, and carries out processing such as a characteristics extraction from the camera image, and specifies the photographed location of MFP 10 by portable type terminal device 30. Further, MFP 10 calculates the distance and the angle between the camera section of portable type terminal device 30 and the photographed location of MFP 10 to obtain the view-point position of the camera section, and obtains a three-dimensional positional relationship of the camera section and the photographed location of MFP 10 (P112).

MFP 10 determines display information corresponding to the photographed location of MFP 10 via the display mode having been set up at P107. Also, in a case in which the display mode is a skeleton display mode, MFP 10 generates a skeleton image of the direction according to the view-point position (direction as viewed from the view-point position) of the camera section, and determines the skeleton image as display information (P113).

MFP 10 superimposes display information onto the camera image by carrying out image superimposition processing (P114), and transmits the superimposed image to portable type terminal device 30 (P115). Portable type terminal device 30 displays the image (superimposed image), having been received from MFP 10, in display section 31 (P116).

In a case in which portable type terminal device 30 does not receive instruction of the completion of operations from the user, portable type terminal device 30 repeats the operations from the step of photographing to the step of display described in P109 to P116 (P117). In a case in which portable type terminal device 30 has received instruction of the completion of operations from the user, portable type terminal device 30 terminates photographing by the camera section and the transmission of the camera image to MFP 10 (P118), and notifies MFP 10 of the completion of operations (P119).

When MFP 10 has received the notification of the completion of operations, MFP 10 carries out a termination processing of communication with portable type terminal device 30 (P120). MFP 10 then notifies portable type terminal device 30 that the termination processing has been completed (P121), and portable type terminal device 30 terminates the dedicated application program, and all processing has been completed (P122).

In such a way, MFP 10, according to this preferred embodiment, determines a photographed location of the MFP based on photographing information of the MFP by portable type terminal device 30, and transmits display information, according to the photographed location, to portable type terminal device 30 to display the display information. Therefore, appropriate display information (display information according to the photographed location) can be displayed in portable type terminal device 30 with a simple configuration, without providing a large number of position detection means, or the like, to detect the position of portable type terminal device 30.

Also, by displaying photographed image by superimposing display information thereon, the generation of images which are the basis of MFP 10 can be omitted, and therefore, the generation of display information becomes simpler. Further, it becomes possible to display the relationship between an actual photographed location (actual object) which is contained in the photographed image and display information in an easily understood manner via physical appearance.

Specifically, as illustrated in FIG. 3, in a case in which a photographed image is displayed by superimposing paper jam position 50 thereon, the paper jam occurrence position, in the actual photographed location which is contained in the photographed image, can be displayed in an easily understood manner by physical appearance, and therefore, the user can easily grasp the paper jam occurrence position in MFP 10. Also, as illustrated in FIG. 4, in a case in which a superimposed image is displayed, which has been generated by superimposing a photographed image on skeleton image 60 of paper jam occurrence positions according to the direction as viewed from the user, the user can grasp the internal state of paper jam occurrence locations and the positions of the jammed paper sheets (it becomes easier for the user to imagine the state of paper jam occurrence position), and therefore, the user can carry out the removal operations of jammed paper sheets in a quick and efficient manner. Also, as illustrated in FIG. 5, in a case in which a paper jam occurrence position has not been photographed, the user can search the paper jam occurrence position easily by displaying paper jam direction image 70, which indicates the direction of the paper jam occurrence position viewed from the photographed location, by superimposing paper jam direction image 70 on the photographed image.

In such a way, particularly in the case of a large-size image forming apparatus which is used for commercial printing, it becomes easier to find and remove a number of jammed paper sheets, which are scattered in the apparatus and difficult to locate. Also, by the reduction of the processing time of jammed paper sheets, the productivity of printing can be improved.

Further, in addition to the case of paper jams, in the cases of various types of events such as an occurrence of an error such as a failure, or the like, and necessity of maintenance, or necessity of manual operations in association with the error or maintenance, various types of display information (such as position information, skeleton image, guidance information, or operation information), in accordance with the occurrence location of the events, can be displayed in portable type terminal device 30. Also, in the cases in which service staff takes charge of fixing errors and maintenance, it becomes easier for the staff to grasp the corresponding locations, internal state, and content of operations from the various types of display information displayed in portable type terminal device 30, resulting in a speed up of operations (improvement of serviceability).

[Second Preferred Embodiment]

In the first preferred embodiment, cases have been described in which MFP 10 carries out the superimposition of a photographed image (camera image), photographed by portable type terminal device 30, and display information with respect to MFP 10. In a second preferred embodiment, the cases will be described in which portable type terminal device 30 carries out the superimposition.

In this preferred embodiment, a function for obtaining a photographed location of MFP 10 and a position of portable type terminal device 30 (camera section) and a function for carrying out image superimposition processing, which has been described in P114 in FIG. 10, are incorporated in an application program for a portable type terminal device. The identifying method of the photographed location based on photographed image is the same of the method which MFP 10 is using as described in the first preferred embodiment. In order for portable type terminal device 30 to have this function, a database is stored in portable type terminal device 30, the database into which collation information (image (image data) of characterizing portions of MFP 10 and the three-dimensional coordinate positions) for identifying the photographed location of MFP 10 has been memorized. This database is the same as the database which has been stored in MFP 10 according to the first preferred embodiment.

FIG. 11 is a sequence diagram illustrating a processing flow of MFP 10 and portable type terminal device 30 according to the second preferred embodiment.

P201 to P209 in FIG. 11 are the same operations as P101 to P109 in FIG. 10 described in the first preferred embodiment. Also, P218 to P221 in FIG. 11 are the same operations of P119 to P122 in FIG. 10. Explanations of those operations, which are the same as in the first preferred embodiment, are omitted.

Portable type terminal device 30 analyzes the camera image (photographed image) of MFP 10 photographed by receiving camera shooting operations by the user, carries out processing such as characteristics extraction from the camera image and comparison with the collation information, and specifies the photographed location of MFP 10, which is contained in the photographed image, by the range of three-dimensional coordinate. The details are the same as the processing of MFP 10 according to the first preferred embodiment. Also, portable type terminal device 30 obtains the view-point position of the camera section by calculating the distance and angle between the camera section of the portable type terminal device and the photographed location of MFP 10 by analyzing the camera image, and obtains a three-dimensional positional relationship between the camera section and the photographed location of MFP 10 (P210).

Portable type terminal device 3 generates photographed location information which indicates photographed location of MFP 10 (the information which indicates the photographed location by coordinates which corresponds to a three-dimensional coordinate system having been set in MFP 10 in advance) and positional relationship information which indicates the three-dimensional positional relationship between the view-point position of the camera section and the photographed location, and then transmits the information to MFP 10 (P211).

MFP 10 specifies the photographed location of the MFP by portable type terminal device 30 based on the photographed location information having been received from portable type terminal device 30. Also, based on the positional relationship information having been received from portable type terminal device 30, MFP 10 recognizes the three-dimensional positional relationship (distance and angle) between the camera section of portable type terminal device 30 and the photographed location of the MFP.

MFP 10 determines display information corresponding to the photographed image of the MFP based on the display mode having been set at P207. Also, in a case in which the display mode is a skeleton display, MFP 10 generates a skeleton image of an direction according to the view-point position (direction as viewed from the view-point position) of the camera section, and determines the skeleton image as display information (P212). MFP 10 transmits that display information to portable type terminal device 30 (P213).

Upon receiving the display information from MFP 10, portable type terminal device 30 carries out the image superimposition processing so as to superimpose the display information on the camera image (P214), and displays the superimposed image in display section 31 (P215). Also, in a case in which portable type terminal device 30 does not receive instruction of the completion of operations from the user, portable type terminal device 30 repeats the operations from photographing until display in P209 to P215 (P216). In a case in which portable type terminal device 30 has received instruction of the completion of operations from the user, portable type terminal device 30 terminates photographing by the camera section and transmission of the information to MFP 10 (P217), and carries out operation P218 onwards.

In such a way, portable type terminal device 30 obtains the photographed location of MFP 10 based on the photographed image, and, by receiving the photographed location information, which indicates the photographed location, from portable type terminal device 30, MFP 10 can transmit display information according to the photographed location of the MFP, which is indicated by the photographed location information, to portable type terminal device 30 to display the display information thereon.

Although the preferred embodiment of the present invention have been fully described by way of examples with reference to the accompanying drawings, it is to be noted that various changes and modifications will be apparent to those skilled in the art. Therefore, unless such changes and modifications depart from the scope of the present invention, they are to be construed as being included therein.

For example, in the preferred embodiments, in a case in which an event, such as a paper jam, occurs in MFP 10, examples have been described in which display information corresponding to the event (the display information corresponding to the occurrence position of the event) is transmitted to portable type terminal device 30 to be displayed thereon. However, regardless of an occurrence of such events, display information, such as the name, position, skeleton image, and contents of operations, or the like, of a prescribed location, according to the photographed location which has been determined based on the photographed image, may be transmitted to portable type terminal device 30 so as to be displayed thereon.

Further, image forming apparatus is not limited to a multi-function peripheral, and can be a printer, a copying machine, or the like. Further, a configuration may be applied in which the various types of databases, which have been provided for the multi-function peripheral in the preferred embodiments, may be provided for an information processing apparatus such as a personal computer, a server, or the like, and the information processing apparatus receives a photographed image of an image forming apparatus from a portable type terminal device, determines a photographed location based on the photographed image, and transmits display information according to the photographed location to the portable type terminal device to display the information thereon. Further, a configuration may be used in which the information processing apparatus receives, from the image forming apparatus, an input of designated location information which indicates a designated location where an event, which is to be notified to the portable type terminal device, is occurring, and transmits the display information according to the designated location to the portable type terminal device to display the information thereon.

What is claimed is:

1. An information processing apparatus comprising:
    a communication section for communicating with a portable type terminal device which is provided with a photographing function, a display function, and a communication function; and
    a control section for: a) receiving a photographed image of an image forming apparatus, having been photographed by said portable type terminal device, from said portable type terminal device; b) determining a photographed region of said image forming apparatus that appears in the photographed image, wherein the determination of the photographed region is based on information from the photographed image; c) determining whether a prescribed location in which an event arises in said image forming apparatus, the event which is to be notified to said portable type terminal device, is included in said photographed region of said image forming apparatus; d) only in a case in which the prescribed location is included in said photographed region of said image forming apparatus, transmitting a first display information corresponding to said prescribed location to said portable type terminal device; and e) only in a case in which the prescribed location is not included in said photographed region of said image forming apparatus, transmitting a second display information corresponding to said prescribed location, said second display information being different from said first display information,
    wherein said second display information comprises guidance information to said prescribed location, wherein said guidance information indicates a position of the prescribed location outside of said photographed region of said image forming apparatus, and wherein the prescribed location is within said image forming apparatus.

2. The information processing apparatus described in claim 1, wherein said control section is configured to: a) determine a view-point position of said portable type terminal device which generated the photographed image, wherein the determination of said view-point position is based on said photographed image; and b) transmit one of said first display information and said second display information of a direction according to that view-point position to said portable type terminal device.

3. The information processing apparatus described in claim 1, wherein said control section is configured to transmit a superimposed image, having been generated by superimposing one of said first display information and said second display information on said photographed image, to said portable type terminal device.

4. The information processing apparatus described in claim 1, further comprising:
    an input section for inputting a designated location information which indicates said prescribed location,
    wherein said control section is configured to transmit: a), in a case in which the designated location, indicated by the prescribed location information having been input by said input section, is included in said photographed region of said image forming apparatus, the first display information corresponding to said prescribed location to said portable terminal device;
    and b), in a case in which the prescribed location is not included in said photographed region of said image forming apparatus, the second display information corresponding to said prescribed location to said portable terminal device.

5. The information processing apparatus described in claim 1, wherein said first display information comprises a perspective image of the prescribed location in which an event arises in said image forming apparatus.

6. The information processing apparatus described in claim 1, wherein said first display information comprises an image indicating a jammed paper.

7. The information processing apparatus described in claim 2, wherein a predetermined mark for determining said view-point position of said portable type terminal device, which photographs said image forming apparatus, is provided on an outer surface of said image forming apparatus, wherein said control section is configured to determine the view-point position of said portable type terminal device based on distortion of said predetermined mark included in said photographed image.

8. The information processing apparatus described in claim 1, wherein said control section is configured to: a) receive, instead of said photographed image, a photographed location information which has been generated by said portable type terminal device based on said photographed image, wherein the photographed location information indicates a photographed region of the image forming apparatus that appears in the photographed image; and b) transmit one of said first display information and said second display information to said portable type terminal device, said display information being in accordance with said photographed region indicated by the photographed location information.

9. The information processing apparatus described in claim 8, wherein said control section is configured to: a) receive a view-point position information which has been obtained by said portable type terminal device based on said photographed image, wherein the view-point position information indicates a view-point position of said portable type terminal device which generated the photographed image; and b) transmit one of said first display information and said second display information of direction according to the view-point position which is indicated by the view-point position information, to said portable type terminal device.

10. An image forming apparatus comprising:
the information processing apparatus described in claim 1; and
a detection section for detecting an occurrence of an event arising in the image forming apparatus, the event which is to be notified to said portable type terminal device, wherein said control section is configured to transmit one of said first display information and said second display information according to the event, detected via said detection section, and said photographed region of said image forming apparatus.

11. The image forming apparatus described in claim 10, wherein when a paper jam with plural jammed paper sheets occurs, said first display information includes plural images each corresponding to the plural jammed paper sheets.

12. The image forming apparatus described in claim 10, wherein a plurality of predetermined marks are provided on an the outer surface of said image forming apparatus and wherein said control section is configured to determine the view-point position of said portable type terminal device based on distortion and placement interval of said plurality of predetermined marks included in said photographed image.

13. An information processing method comprising steps of:
communicating with a portable type terminal device which is equipped with a photographing function, a display function, and a communication function;
receiving a photographed image of an image forming apparatus, having been photographed by said portable type terminal device, from said portable type terminal device;
determining a photographed region of the image forming apparatus that appears in the photographed image, wherein the determination of the photographed region is based on information from the photographed image;
determining whether a prescribed location in which an event arises in said image forming apparatus, the event which is to be notified to said portable type terminal device, is included in said photographed region of said image forming apparatus;

only in a case in which the prescribed location is included in said photographed region of said image forming apparatus, transmitting a first display information corresponding to said prescribed location to said portable type terminal device; and
only in a case in which the prescribed location is not included in said photographed region of said image forming apparatus, transmitting a second display information corresponding to said prescribed location, said second display information being different from said first display information,
wherein said second display information comprises guidance information to said prescribed location, wherein said guidance information indicates a position of the prescribed location outside of said photographed region of said image forming apparatus, and wherein the prescribed location is within said image forming apparatus.

14. The information processing method of claim 13, further comprising generating a superimposed image by superimposing one of said first display information and said second display information on said photographed image, wherein the transmitting of any of said first display information and said second display information to said portable type terminal device is performed by transmitting the superimposed image to said portable type terminal device.

15. The information processing method of claim 13, wherein said first display information comprises a perspective image of the prescribed location in which an event arises in said image forming apparatus.

16. The information processing method of claim 13, wherein said first display information comprises an image indicating a jammed paper.

17. A nontransitory computer-readable recording medium recorded therein a program to enable functions of an information processing apparatus, the functions comprising:
communicating with a portable type terminal device which is equipped with a photographing function, a display function, and a communication function;
receiving a photographed image of an image forming apparatus, having been photographed by said portable type terminal device, from said portable type terminal device;
determining a photographed region of the image forming apparatus that appears in the photographed image, wherein the determination of the photographed region is based on information from the photographed image;
determining whether a prescribed location in which an event arises in said image forming apparatus, the event which is to be notified to said portable type terminal device, is included in said photographed region of said image forming apparatus;
only in a case in which the prescribed location is included in said photographed region of said image forming apparatus, transmitting a first display information corresponding to said prescribed location to said portable type terminal device; and
only in a case in which the prescribed location is not included in said photographed region of said image forming apparatus, transmitting a second display information corresponding to said prescribed location, said second display information being different from said first display information,
wherein said second display information comprises guidance information to said prescribed location, wherein said guidance information indicates a position of the prescribed location outside of said photographed region of said image forming apparatus, and wherein the prescribed location is within said image forming apparatus.

18. The nontransitory computer-readable recording medium described in claim 17, wherein the functions further comprise:

generating a superimposed image by superimposing one of said first display information and said second display information on said photographed image, wherein the transmitting of any of said first display information and said second display information to said portable type terminal device is performed by transmitting the superimposed image to said portable type terminal device.

19. The nontransitory computer-readable recording medium described in claim 17, wherein said first display information comprises a perspective image of the prescribed location in which an event arises in said image forming apparatus.

20. The nontransitory computer-readable recording medium described in claim 17, wherein said first display information comprises an image indicating a jammed paper.

21. The nontransitory computer-readable recording medium described in claim 17, wherein said first display information comprises an image indicating a jammed paper.

* * * * *